(12) United States Patent
Effler

(10) Patent No.: US 10,832,197 B1
(45) Date of Patent: Nov. 10, 2020

(54) CREATING AND UTILIZING BILL OF WORK INFORMATION TO PROVIDE A DYNAMIC ROUTING PLAN FOR MANUFACTURING A PRODUCT

(71) Applicant: EMC Corporation, Hopkinton, MA (US)

(72) Inventor: Marie Effler, Crookstown (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 1031 days.

(21) Appl. No.: 14/672,841

(22) Filed: Mar. 30, 2015

(51) Int. Cl.
*G06Q 10/00* (2012.01)
*G06Q 10/06* (2012.01)
*G06Q 10/08* (2012.01)

(52) U.S. Cl.
CPC ... *G06Q 10/06316* (2013.01); *G06Q 10/0875* (2013.01)

(58) Field of Classification Search
None
See application file for complete search history.

(56) References Cited

U.S. PATENT DOCUMENTS

| | | | | |
|---|---|---|---|---|
| 6,714,915 | B1 * | 3/2004 | Barnard | G06Q 10/06 705/7.13 |
| 7,269,574 | B2 * | 9/2007 | Izuna | G06Q 10/087 705/28 |
| 7,337,032 | B1 | 2/2008 | Nettles et al. | |
| 7,480,538 | B2 | 1/2009 | Volant et al. | |
| 7,941,341 | B2 * | 5/2011 | Johnson | G06Q 10/06 705/16 |
| 8,600,841 | B2 * | 12/2013 | Cheng | G06Q 10/0631 705/28 |
| 9,111,310 | B2 | 8/2015 | Comstock et al. | |
| 9,304,332 | B2 | 4/2016 | Fonte et al. | |
| 9,489,650 | B2 * | 11/2016 | Schoening | G06Q 10/087 |
| 2002/0138316 | A1 * | 9/2002 | Katz | G06Q 30/0202 705/7.13 |
| (Continued) | | | | |
| 2002/0174000 | A1 * | 11/2002 | Katz | G06Q 10/087 705/7.26 |

OTHER PUBLICATIONS

Bastien, Conditional Row Color Based on Cell Value, Nov. 7, 2005, Asap Utilizities, https://www.asap-utilities.com/blog/index.php/2005/11/07/conditional-row-color-based-on-a-cell-value/comment-page-2/, p. 1-16.*

*Primary Examiner* — Joseph M Waesco
(74) *Attorney, Agent, or Firm* — BainwoodHuang

(57) ABSTRACT

A technique provides a dynamic routing plan for manufacturing a product. The technique involves expanding an electronic sales order for the product into individual bill of materials (BOM) elements and bill of work (BOW) elements, the BOM elements identifying components of the product (e.g., materials, parts, sub-assemblies, etc.), and the BOW elements specifying BOW activities to be performed on the components identified by the BOM elements. The technique further involves identifying work attributes for the BOW activities specified by the BOW elements (e.g., manufacturing stages, expected work time at each stage, etc.). The technique further involves constructing the dynamic routing plan based on the BOW elements and the work attributes identified for the BOW activities specified by the BOW elements. The dynamic routing plan (i) defines a sequence for performing the BOW activities as well as (ii) provides the work attributes for the BOW activities to manufacture the product.

16 Claims, 10 Drawing Sheets

(56) References Cited

U.S. PATENT DOCUMENTS

| | | | | |
|---|---|---|---|---|
| 2002/0178077 | A1* | 11/2002 | Katz | G06Q 10/10 705/7.36 |
| 2003/0033179 | A1* | 2/2003 | Katz | G06Q 10/0639 705/7.12 |
| 2003/0149608 | A1* | 8/2003 | Kall | G06Q 10/063 705/7.27 |
| 2003/0177050 | A1* | 9/2003 | Crampton | G06Q 10/06 700/97 |
| 2003/0200130 | A1* | 10/2003 | Kall | G06Q 10/0637 705/7.36 |
| 2004/0128176 | A1* | 7/2004 | Jordan | G06Q 99/00 705/7.22 |
| 2004/0205519 | A1* | 10/2004 | Chapel | G06Q 10/06 715/211 |
| 2006/0052895 | A1* | 3/2006 | Woehler | G06Q 10/08 700/107 |
| 2007/0192715 | A1* | 8/2007 | Kataria | G06F 19/326 715/764 |
| 2008/0154412 | A1* | 6/2008 | Steinbach | G05B 19/41865 700/97 |
| 2008/0154660 | A1* | 6/2008 | Steinbach | G06Q 10/06 705/7.11 |
| 2011/0143811 | A1* | 6/2011 | Rodriguez | H04N 1/00127 455/556.1 |
| 2011/0251868 | A1* | 10/2011 | Mikurak | G06Q 30/0202 705/7.25 |
| 2011/0282476 | A1 | 11/2011 | Hegemier et al. | |
| 2013/0024226 | A1* | 1/2013 | Bourke | G06Q 10/06 705/7.12 |
| 2014/0222610 | A1* | 8/2014 | Mikurak | G06Q 30/0633 705/26.5 |
| 2015/0055086 | A1 | 2/2015 | Fonte et al. | |
| 2015/0058052 | A1* | 2/2015 | Kohlhoff | G06Q 10/0631 705/7.12 |

* cited by examiner

| Item Field 212 | Element ID Field 214 | Qty Field 216 | Description Field 218 | Category Field 220 | Other Fields 222 | |
|---|---|---|---|---|---|---|
| 1 | PSVNX7902 | 1 | PSI FOR VNX7902 | ZTFL | HW L1 (Parts) | ... |
| 2 | VNXB79DP25 | 1 | VNX7902 DPE 25x2.5 Drive Slots | ZFAS | HW L2 (Models) | ... |
| 3 | 900-566-0211 | 1 | VNX7902 PSNT | ZTPL | HW L3 (Parts) | ... |
| 4 | 100-563-712-88 | 1 | VNX7902 M1 TLA | ZTPL | HW L3 (Parts) | ... |
| 5 | 106-562-0778 | 1 | ACCESSORY KIT, FACT INST | ZFAS | L4 (Int. Parts) | ... |
| 6 | ACT-N0170 | 2 | Fixed Rail Install | BOW | Static Inst. | ... |
| 7 | ACT-N0169 | 1 | Chassis Install | BOW | Static Inst. | ... |
| 8 | ACT-N0133 | 6 | Cable Labeling | BOW | Qual. Aud. | ... |
| 9 | 040-0029952 | 1 | DRIVE FILLER, 2.5IN | ZTPL | L4 (Int. Parts) | ... |
| 10 | 100-202-002D-9 | 1 | VNX7902 SP 2.1 GHZ 8C 64GB | ZTPL | HW L3 (Parts) | ... |
| 11 | 100-565-9112 | 3 | ASSY BEZEL FOR VNX7902 | ZTPM | L4 (Int. Parts) | ... |
| 12 | ACT-P940 | 1 | Power Config for VNX7902 | BOW | Config. Inst. | ... |
| 13 | ACT-O943 | 1 | Post Prep Quality Audit | BOW | Qual. Aud. | ... |
| 14 | 100-433-099-00 | 1 | VNX7902 CONSOLE ASSY | ZTPL | HW L3 (Parts) | ... |
| 15 | SBPP-S014 | 1 | Single Bay Pallet and Pack | BOW | Static Inst. | ... |
| ... | ... | ... | ... | ... | ... | ... |

FIG. 4

| Element ID Field 252 | Description Field 254 | Category Field 256 | BOW Category Field 258 | Standard Time Field 260 | Assigned Manufacturing Stage Field 262 | |
|---|---|---|---|---|---|---|
| ACT-K055 | Picklist Chassis | BOW | Kitting and Build | 15 | CTO Runner | ... |
| ACT-K056 | ACCESSORY KIT, FACT INST | BOW | Kitting and Build | 15 | CTO Desk | ... |
| ACT-N0131 | Cable Labeling 0.0 | BOW | Static Inst. | 30 | Cable & Key | ... |
| ACT-N0133 | Cable Labeling | BOW | Static Inst. | 20 | Cable & Key | ... |
| ACT-N0169 | Chassis Install | BOW | Qual. Aud. | 10 | Mech. Build | ... |
| ACT-N0170 | Fixed Rail Install | BOW | Static Inst. | 5 | Mech. Build | ... |
| ACT-N0172 | Power Cabling | BOW | Static Inst. | 15 | Mech. Build | ... |
| ACT-N01380 | Picklist Cables and Labels | BOW | Kitting and Build | 5 | CTO Runner | ... |
| CFG-999 | Test Script | BOW | FC Test | 30 | FC Test | ... |
| ACT-930 | Power Config for VNX7852 | BOW | Config. Inst. | 20 | CTO Desk | ... |
| ACT-932 | Power Config for VNX7880 | BOW | Config. Inst. | 20 | CTO Desk | ... |
| ACT-P940 | Power Config for VNX7902 | BOW | Config. Inst. | 25 | CTO Desk | ... |
| ACT-O943 | Post Prep Qualtiy Audit | BOW | Qual. Aud. | 15 | Post FC Test | ... |
| ACT-O966 | Post Prep | BOW | Sample Audit | 15 | Post FC Test | ... |
| SBPP-S014 | Single Bay Pallet and Pack | BOW | Static Inst. | 25 | Cab Pack | ... |
| ... | ... | ... | ... | ... | ... | ... |

FIG. 5

Bill of Work - Dynamic Routing Plan

Enter Sales Order Number: 33309004　　　　　Generate Dynamic Routing

| Item # | Material | Qty | Description | Category | Reporting Cell | Standard Time | |
|---|---|---|---|---|---|---|---|
| 1 | Picklist Chassis | 1 | Pick chassis from avail stock | BOW | CTO Runner | 1 | Link |
| 2 | GMC-N0189 | 1 | Factory install kit sheet gen. | BOW | CTO Desk | 1 | Link |
| 3 | ACE Chassis Config | 1 | ACE sheet of J Chassis | BOW | CTO Desk | 1 | Link |
| 4 | ACE Chassis Config | 3 | ACE sheet of DAE Chassis | BOW | CTO Desk | 1 | Link |
| 5 | GMC-N0136 | 1 | J fixed rail install | BOW | Mech. Build | 1 | Link |
| 6 | GMC-N0137 | 1 | J chassis install | BOW | Mech. Build | 1 | Link |
| 7 | Just Q Rack | 1 | Cab rack install | BOW | Mech. Build | 1 | Link |
| 8 | GMC-0136 | 1 | Cable labeling | BOW | Kitting | 1 | Link |

< Page 1 2 3 4 5 >　　☐ Complete

Total Time: 56

Save Changes

FIG. 7

Bill of Work - Dynamic Routing Plan

Enter Sales Order Number: 33309004

Generate Dynamic Routing

| Item # | Material | Qty | Description | Category | Reporting Cell | Standard Time | | |
|---|---|---|---|---|---|---|---|---|
| 1 | Picklist Chassis | 1 | Pick chassis from avail stock | BOW | CTO Runner | 1 | Link | ■ Complete |
| 2 | GMO-N0189 | 1 | Factory install kit sheet gen. | BOW | CTO Desk | 1 | Link | ☐ Complete |
| 3 | ACE Chassis Config | 1 | ACE sheet of J Chassis | BOW | CTO Desk | 1 | Link | ☐ Complete |
| 4 | ACE Chassis Config | 3 | ACE sheet of DAE Chassis | BOW | CTO Desk | 1 | Link | ☐ Complete |
| 5 | GMO-N0136 | 1 | J fixed rail install | BOW | Mech. Build | 1 | Link | |
| 6 | GMO-N0137 | 1 | J chassis install | BOW | Mech. Build | 1 | Link | |
| 7 | Just Q Rack | 1 | Cab rack install | BOW | Mech. Build | 1 | Link | |
| 8 | GMO-0186 | 1 | Cable labeling | BOW | Kitting | 1 | Link | |

< Page 1 2 3 4 5 >

Total Time: 56

Save Changes

FIG. 8

CREATING AND UTILIZING BILL OF WORK INFORMATION TO PROVIDE A DYNAMIC ROUTING PLAN FOR MANUFACTURING A PRODUCT

BACKGROUND

A manufacturing bill of materials or MBOM for a product is a list of raw materials, parts, and sub-assemblies which are needed to manufacture that product. A manufacturer typically refers to MBOMs to ensure that the right material is assigned for the right sales order, and also helps planning material needs based on a forecast to be available for product production.

Some conventional enterprise requirement planning (ERP) systems hold MBOMs along with other information to understand overall inventory requirements for an entire plant. As a result, these ERP systems are able to efficiently control inventory levels and optimize material purchasing activities.

SUMMARY

Unfortunately, a manufacturing bill of materials (MBOM) for a product does not reflect work activities that are required to manufacture the product. Along these lines, the MBOM does not include any granular notion of routing (e.g., the flow of materials through each location or cell of a plant during manufacturing) or time (e.g., the number of hours that must be spent at each location or cell within the plant to properly manufacture the product). Accordingly, the MBOM may be useful for ensuring the right material is used and enables materials requirement planning (MRP), but is not sufficient for manufacturing execution.

To improve manufacturing execution, some manufacturers utilize a separate manufacturing execution system (MES). Such a system attempts to assist the manufacturers by defining a standard product, and then precisely controlling elements of their manufacturing processes for that standard product such as inputs, personnel, machines, support services, and so on.

While a conventional MES may work satisfactorily with minimal setup required on a manufacturing process which manufactures a standard product (i.e., the same product over and over again), a conventional MES is poorly suited for situations in which products are routinely customized, i.e., built or assembled to order, etc. In particular, it is impractical for a conventional MES to effectively model or define each custom product permutation since it is not feasible to predict every possible built-to-order permutation. Accordingly, for a manufacturer that routinely builds to order, the conventional MES falls short in providing an effective means of precisely predicting, planning and controlling the various elements of the manufacturing process.

In contrast, improved techniques are directed to utilizing newly created "bill of work" information to provide a dynamic routing plan for manufacturing a product. This bill of work information identifies the "work to be done" (i.e., the steps or activities that are required to be completed) in order to manufacture the product. Along these lines, a sales order for a particular product is endowed with individual bill of materials (BOM) elements, which is conventional, and bill of work (BOW) elements, which is, as such, new. Next, a granular routing of the steps that are required when manufacturing the product (i.e., a dynamic routing plan) is generated directly from the sales order. With such granular routing information now available, the manufacturer is able to effectively control various elements of the manufacturing process even if the sales order is for a custom product (i.e., a product which is built or assembled to order).

One embodiment is directed to a computer-implemented method of providing a dynamic routing plan for manufacturing a product. The computer-implemented method includes expanding, by processing circuitry, an electronic sales order for the product into individual BOM elements and BOW elements, the BOM elements identifying components of the product (e.g., materials, parts, sub-assemblies, etc.), and the BOW elements specifying BOW activities to be performed on the components identified by the BOM elements (e.g., to transform or assemble the components). The computer-implemented method further includes identifying, by the processing circuitry, work attributes for the BOW activities specified by the BOW elements (e.g., manufacturing stages, expected work time of each stage, etc.). The computer-implemented method further includes constructing, by the processing circuitry, the dynamic routing plan based on the BOW elements and the work attributes identified for the BOW activities specified by the BOW elements. The dynamic routing plan (i) defines a sequence for performing the BOW activities as well as (ii) provides the work attributes for the BOW activities to manufacture the product.

In some arrangements, a BOW element definitions database stores BOW element entries which define (i) the BOW elements and (ii) the work attributes for the BOW activities specified by the BOW elements. In these arrangements, identifying the work attributes for the BOW activities includes obtaining the work attributes from the BOW element entries stored in the BOW element definitions database.

In some arrangements, a manufacturing stage database stores manufacturing stage entries which define (i) manufacturing stages which are available at a facility which manufactures the product and (ii) an order for the manufacturing stages which are available at the facility. In these arrangements, constructing the dynamic routing plan includes deriving the sequence for performing the BOW activities from the manufacturing stage entries stored in the manufacturing stage database.

In some arrangements, each BOW element entry stored in the BOW element definitions database defines, as work attributes, (i) a particular manufacturing stage of the facility which manufactures the product, the particular manufacturing stage being where a particular BOW activity is to be performed and (ii) a prescribed amount of time in which to perform the particular BOW activity at the particular manufacturing stage when manufacturing the product.

In some arrangements, the manufacturing stage database is separate and distinct from the BOW element definitions database. In these arrangements, each manufacturing stage entry stored in the manufacturing stage database defines (i) a current manufacturing stage and (ii) a preceding manufacturing stage which precedes the current manufacturing stage.

In some arrangements, expanding the electronic sales order for the product into the individual BOM elements and BOW elements includes (i) inputting the BOM elements of the electronic sales order as BOM element line items in a spreadsheet, and (ii) inputting the BOW elements of the electronic sales order as BOW element line items in the spreadsheet.

In some arrangements, identifying the work attributes for the BOW activities specified by the BOW elements includes (i) removing the BOM element line items from the spreadsheet, and (ii) inputting manufacturing stage identifiers into the BOW element line items in the spreadsheet.

In some arrangements, each BOW element line item identifies a particular BOW activity. Here, inputting the manufacturing stage identifiers into the BOW element line items in the spreadsheet includes, for each BOW element line item in the spreadsheet:

(i) reading a BOW element identifier from that BOW element line item, from a BOW element definitions database, finding a respective BOW element entry corresponding to that BOW element identifier, (ii) retrieving a respective manufacturing stage identifier from that respective BOW element entry, and (iii) storing that respective manufacturing stage identifier in that BOW element line item.

In some arrangements, constructing the dynamic routing plan includes cross-referencing the BOW element line items in the spreadsheet with a manufacturing stage database to identify a starting BOW element line item which represents a starting BOW activity in the sequence defined by the dynamic routing plan.

In some arrangements, constructing the dynamic routing plan further includes further cross-referencing the BOW element line items in the spreadsheet with the manufacturing stage database to identify subsequent BOW element line items which represent subsequent BOW activities to form the sequence defined by the dynamic routing plan.

In some arrangements, the method further includes rendering the sequence for performing the BOW activities defined by the dynamic routing plan in a graphical user interface (GUI) which (i) prompts a user to identify which BOW activities have been completed and (ii) highlights uncompleted BOW activities which are next in the sequence.

In some arrangements, the product is a data storage system, In certain arrangements, the GUI displays multiple rows, and rendering the sequence for performing the BOW activities includes outputting, in each row of the GUI, (i) a respective data storage system construction activity, (ii) a data storage system manufacturing stage where the respective data storage system construction activity is performed, and (iii) a prescribed amount of time in which to perform the respective data storage system construction activity while manufacturing the data storage system.

Another embodiment is directed to an electronic apparatus to provide a dynamic routing plan for manufacturing a product. The electronic apparatus includes a communications interface, memory, and control circuitry coupled to the communications interface and the memory. The memory stores instructions which, when carried out by the control circuitry, cause the control circuitry to:

(A) expand an electronic sales order for the product, which is received through the communications interface, into individual BOM elements and BOW elements, the BOM elements identifying components of the product, and the BOW elements specifying BOW activities to be performed on the components identified by the BOM elements, (B) identify work attributes for the BOW activities specified by the BOW elements, and (C) construct the dynamic routing plan based on the BOW elements and the work attributes identified for the BOW activities specified by the BOW elements, the dynamic routing plan (i) defining a sequence for performing the BOW activities and (ii) providing the work attributes for the BOW activities to manufacture the product.

Yet another embodiment is directed to a computer program product having a non-transitory computer readable medium which stores a set of instructions to provide a dynamic routing plan for manufacturing a product. The set of instructions, when carried out by computerized circuitry, causes the computerized circuitry to perform a method of:

(A) expanding an electronic sales order for the product into individual BOM elements and BOW elements, the BOM elements identifying components of the product, and the BOW elements specifying BOW activities to be performed on the components identified by the BOM elements;

(B) identifying work attributes for the BOW activities specified by the BOW elements; and (C) constructing the dynamic routing plan based on the BOW elements and the work attributes identified for the BOW activities specified by the BOW elements, the dynamic routing plan (i) defining a sequence for performing the BOW activities and (ii) providing the work attributes for the BOW activities to manufacture the product.

It should be understood that, in the cloud context, certain circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in utilizing BOW information to provide a dynamic routing plan for manufacturing a product.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a diagram of an example electronic representation of an expanded sales order including bill of material elements and bill of work elements.

FIG. 5 is a diagram of an example bill of work element definitions database.

FIG. 7 is a first view of a graphical user interface of the electronic apparatus during a first operating time.

FIG. 8 is a second view of the graphical user interface of the electronic apparatus during a second operating time.

DETAILED DESCRIPTION

An improved technique is directed to utilizing bill of work information to provide a dynamic routing plan for manufacturing a product. This bill of work information identifies the "work to be done" (i.e., the steps or activities that are required to be completed) in order to manufacture the product. Along these lines, a sales order for a particular product is endowed with individual bill of materials elements and bill of work elements. The product could be a combination of various "sellable" models that get combined together. The bill of materials and the bill of work are associated to each individual "sellable" model. Next, a granular routing of the steps that are required when manufacturing the product (i.e., a dynamic routing plan) is generated from the sales order. With such granular routing information now available, the manufacturer is able to effectively control various elements of the manufacturing process even if the sales order is for a custom product (i.e., a product which is built or assembled to order as opposed to pre-defined).

Figure 1:
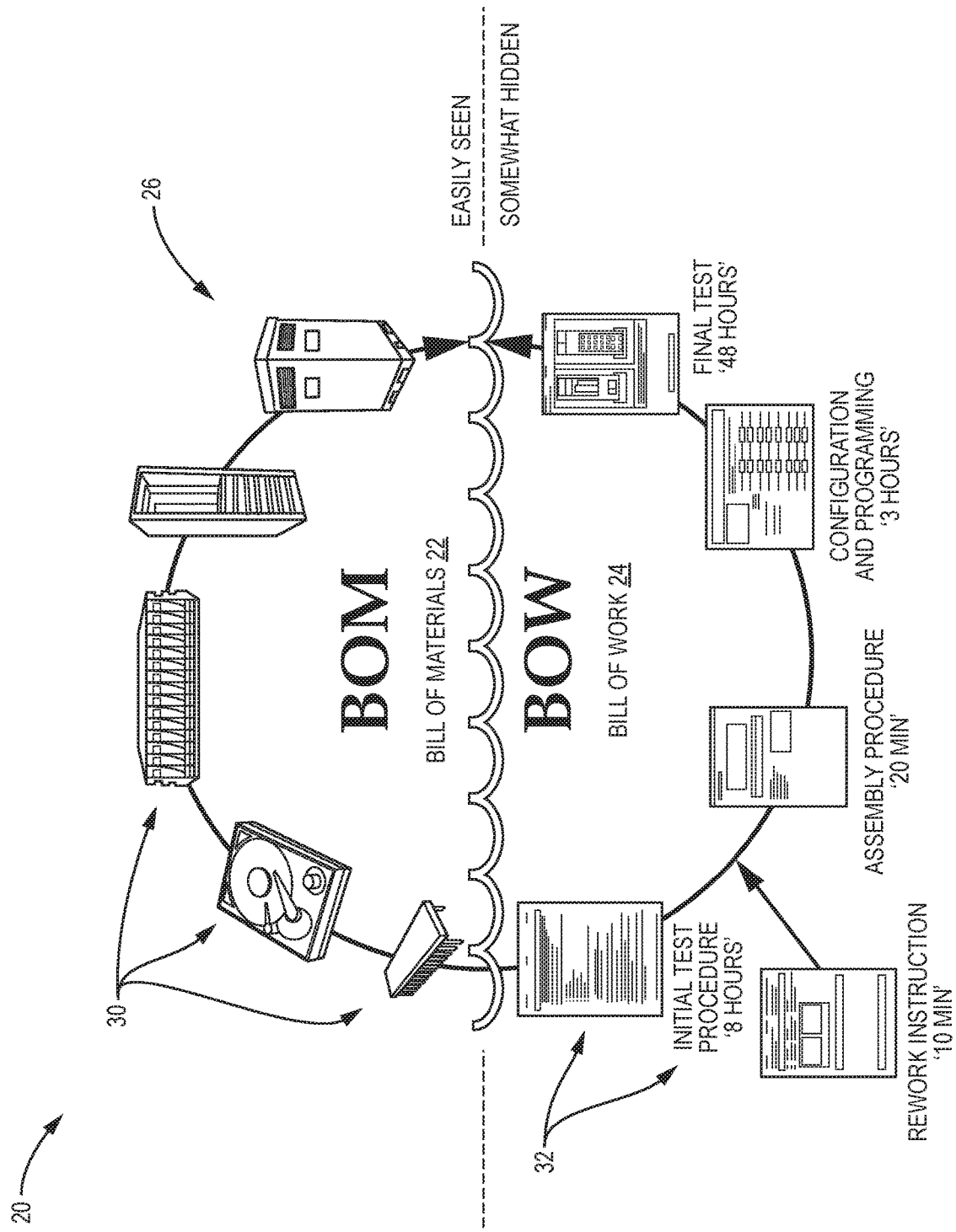
FIG. 1 is a diagram illustrating a relationship between a bill of materials and a bill of work with respect to a manufacturing process for a data storage system.

FIG. 1 shows a view 20 of a relationship between a bill of materials 22 and a bill of work 24 with respect to a process for manufacturing a product 26 (see semi-circular arrows going left to right). For illustration purposes and by way of example, the product 26 is a built-to-order data storage system (i.e., specialized equipment to store and load host data on behalf of host computers). Upon completion of the manufacturing process, the product 26 is ready for shipping.

The bill of materials or BOM 22 is a list of the physical items or components 30 (e.g., materials, parts, sub-assemblies, etc.) that make up the product 26. As shown in FIG. 1, these BOM components 30 are visible (i.e., easily seen) and thus relatively straight forward for the manufacturer to monitor and manage (e.g., count, locate, track, etc.).

The bill of work or BOW 24 is a list of the particular work 32 (e.g., activities, steps, procedures, etc.) that is required to manufacture the product 26. As shown in FIG. 1 and in contrast to the components 30, the particular work 32 of the manufacturing process is difficult to see (i.e., somewhat hidden) even though the particular work 32 must be performed and is thus meaningful to monitor, manage and organize systematically.

In the context of a data storage system, examples of BOM components 30 include specialized integrated circuit (IC) packages which must be soldered to a printed circuit board (PCB), storage devices which must be plugged into disk enclosures, cables and disk enclosures which must be installed in electronic cabinets, and electronic cabinets which must be properly boxed and secured to shipping pallets. Additionally, in the context of the data storage system, examples of particular work 32 (hereinafter referred to as BOW activities 32) include test procedures that must be performed on ICs/PCBs/storage devices/assemblies/etc., rework procedures which must be performed on data storage components to modify and/or upgrade functionality, assembly and installation activities, and configuration and programming activities, among others.

Although the individual activities 32 of the BOW 24 for the above-described data storage system may be straight forward to quantify consistently (e.g., the same activity instructions at each stage, consumption of the same facility resources at each stage, the same amount of time at each stage, and so on), it should be understood that a typical data storage system is built or assembled to order (i.e., custom built overall). That is, each customer may have a particular data storage system application in mind (e.g., website, banking, email server, online store, health records, content distribution, etc.) and thus different storage processing requirements, different storage capacity requirements, different fault tolerance requirements, different power requirements, different cooling requirements, and so on. Accordingly, it requires a lot of setup to effectively control manufacturing execution using a conventional MES which could require modeling/defining each data storage system permutation and which could also require doing so in a separate system. However, such manufacturing execution control is relatively straight forward using the techniques disclosed herein which generates a granular routing plan based on expansion of an electronic sales order into bill of material elements and bill of work elements. Moreover, all is capable of being contained in one system so that there is no need to map a sales order from one system (e.g., an ERP system) with a routing to another system (e.g., an MES). Further details will now be provided with reference to FIG. 2.

Figure 2:
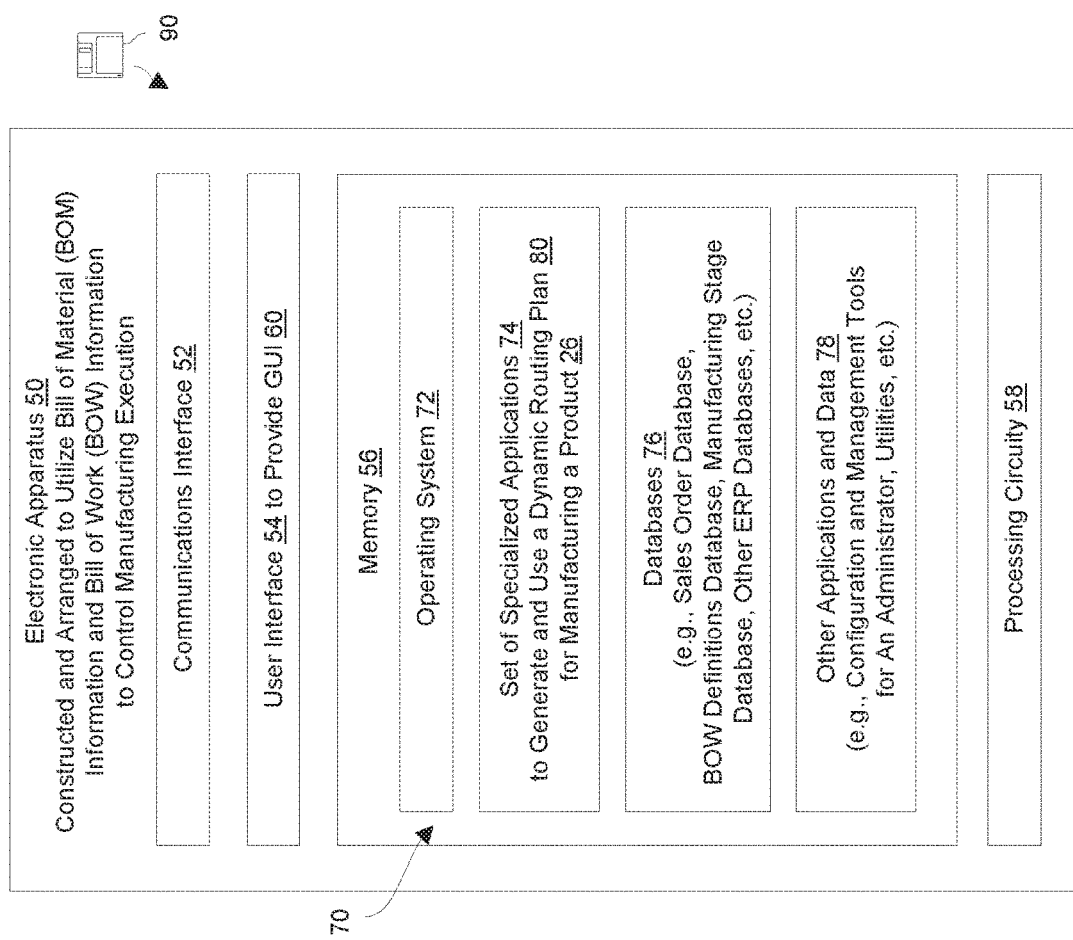
FIG. 2 is a block diagram of an electronic apparatus which uses bill of work information to provide a dynamic routing plan for manufacturing a product.

FIG. 2 is a block diagram of an electronic apparatus 50 which uses BOM information and BOW information to control manufacturing execution. The electronic apparatus 50 includes a communications interface 52, a user interface 54, memory 56, and processing circuitry 58.

The communications interface 52 is constructed and arranged to connect the electronic apparatus 50 to a communications medium to enable communications with other devices of an electronic environment (e.g., client devices operated by human workers in a manufacturing facility, other departments of an enterprise resource planning system, etc.). Such communications may be IP-based, SAN-based, cellular-based, cable-based, fiber-optic based, wireless, combinations thereof, and so on. Accordingly, the communications interface 52 enables the electronic apparatus 50 to robustly and reliably communicate with external apparatus.

The user interface 54 is constructed and arranged to receive user input from, and provide user output to one or more users of the electronic apparatus 50. Along these lines, the user interface 54 can include a keyboard, a pointing device (e.g., a mouse, a touch pad, a trackball, etc.), and an electronic display to render a graphical user interface (GUI) 60. In some arrangements, the user interface 54 utilizes one or more other client devices such as tablets or smart phones which are equipped with touch screens to render the GUI 60.

The memory 56 is intended to represent both volatile storage (e.g., DRAM, SRAM, etc.) and non-volatile storage (e.g., flash memory, magnetic memory, etc.). The memory 56 stores a variety of software constructs 70 including an operating system 72 to manage resources of the electronic apparatus 50 (e.g., processor cycles, memory space, etc.), a set of specialized applications 74 to control manufacturing execution, databases 76 (e.g., a sales order database, a BOW definitions database, a manufacturing stage database, other enterprise resource planning (ERP) databases such as a customer database, a BOM database, and so on), and other applications and data 78 (e.g., configuration and management tools, utilities, other user level applications, etc.).

The processing circuitry 58 is constructed and arranged to operate in accordance with the various software constructs 70 stored in the memory 56. As will be explained in further detail shortly, the processing circuitry 58 executes the set of specialized applications 74 to generate a dynamic routing plan 80 for manufacturing a product 26. Such processing circuitry 58 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the electronic apparatus 50. In particular, the computer program product 90 has a non-transitory (or non-volatile) computer readable medium which stores a set of instructions which controls one or more operations of the electronic apparatus 50. Examples of suitable computer readable storage media include tangible articles of manufacture and apparatus which store instructions in a non-volatile manner such as CD-ROM, flash memory, disk memory, tape memory, and the like.

During operation, the electronic apparatus 50 performs useful work. In particular, the electronic apparatus 50 executes the various software constructs 70 to form specialized circuitry to provide enhanced manufacturing execution control. In particular, the electronic apparatus 50 takes, as input, a sales order for a product 26 such as a data storage system and generates a dynamic routing plan 80 for manufacturing the product 26. Further detail will now be provided with reference to FIGS. 3 through 6.

Figure 6:
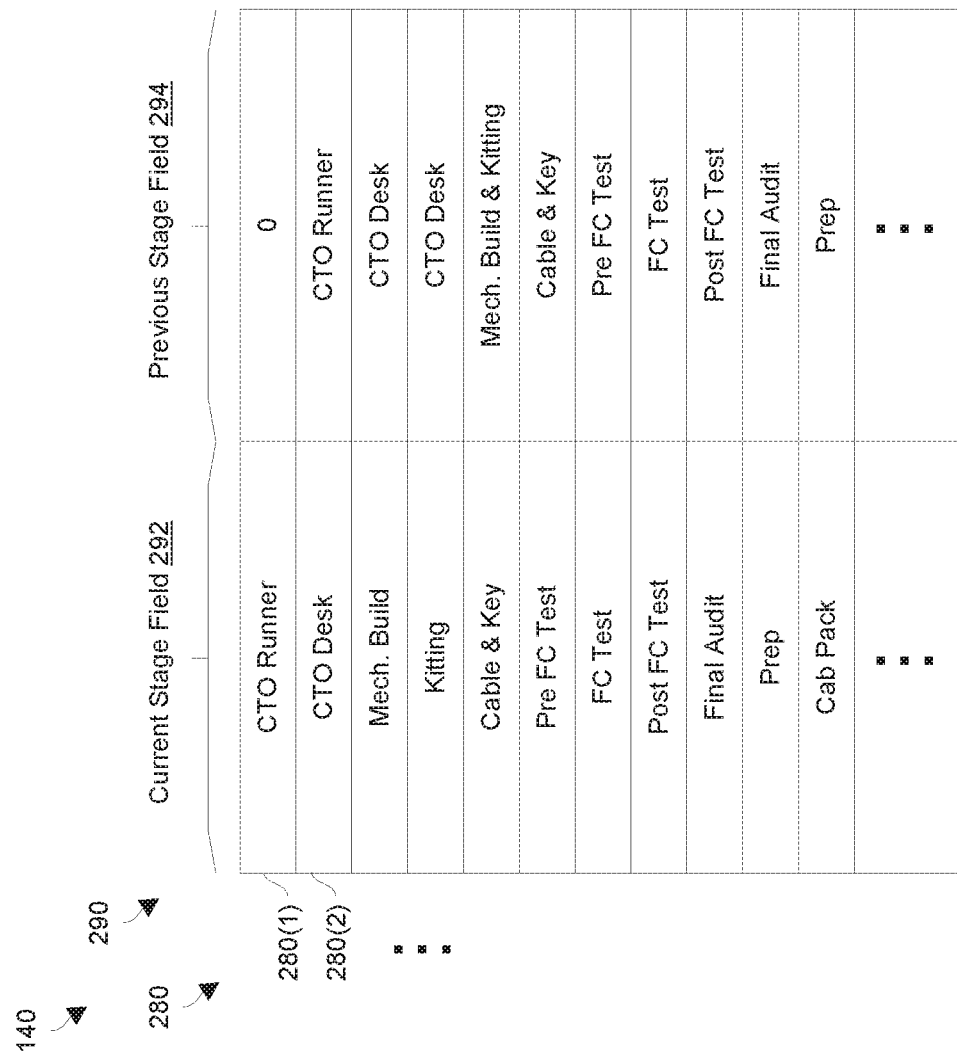
FIG. 6 is a diagram of an example manufacturing stage database.

FIGS. 3 through 6 illustrate particular details of how specialized circuitry 100 of the electronic apparatus 50 operates to generate a dynamic routing plan 80 from an electronic sales order 110. Recall that, at least in some arrangements, the specialized circuitry 100 is formed by the processing circuitry 58 executing the set of specialized applications 74. FIG. 4 shows an example electronic representation of an expanded sales order 120 which is used by the specialized circuitry 100. FIG. 5 shows an example BOW element definitions database 130 which is accessed by the specialized circuitry 100. FIG. 6 shows an example manufacturing stage database 140 which is accessed by the specialized circuitry 100.

Figure 3:
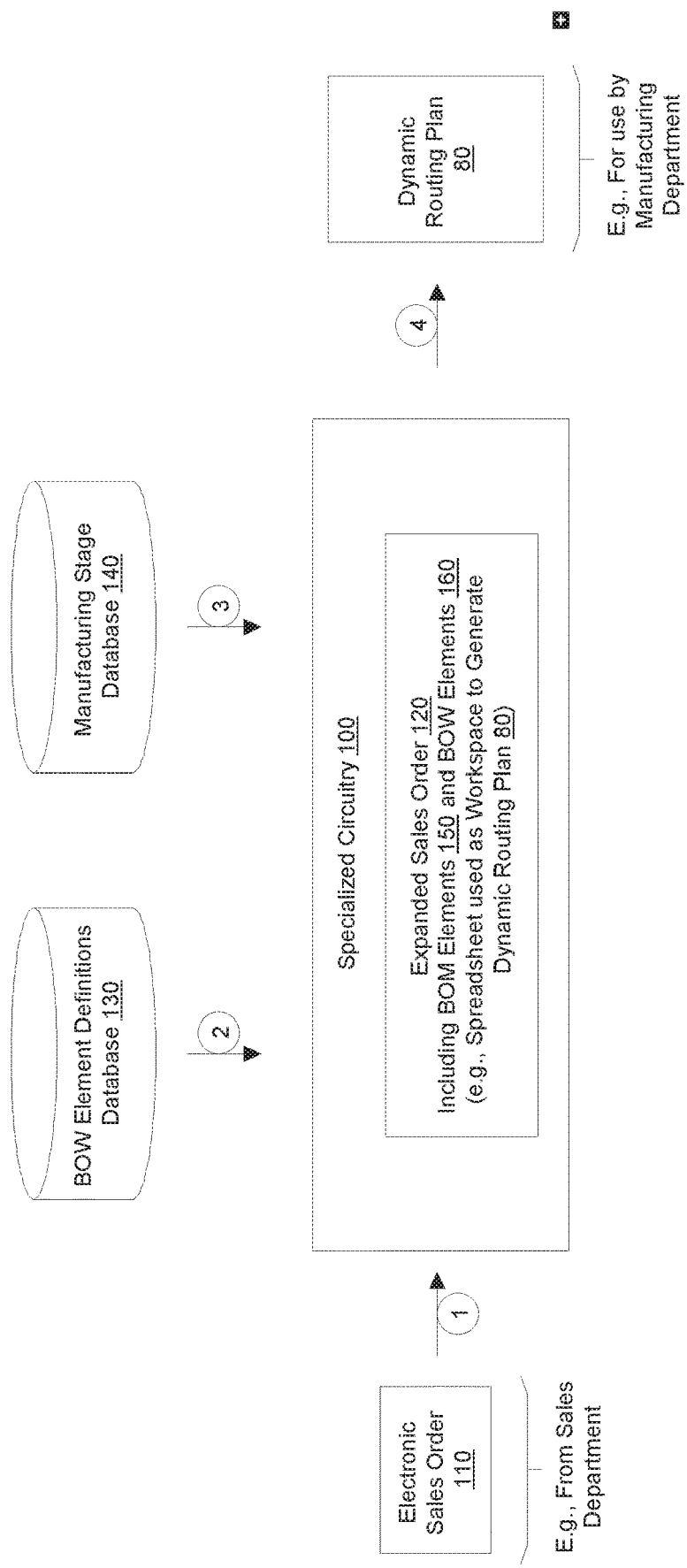
FIG. 3 is a diagram of illustrating how specialized circuitry of the electronic apparatus of FIG. 2 operates to generate a dynamic routing plan from an electronic sales order.

As shown in FIG. 3, the specialized circuitry 100 initially receives an electronic sales order 110 as input (see arrow #1). For example, the sales department of an enterprise may have recently reached a sales agreement regarding a data storage system which must be built to order (i.e., a custom-made data storage system according to a specific customer request). Along these lines, the data storage system may require specific hardware (e.g., processors, cache, storage devices, power supplies, cabling, appliances, chassis/housings, etc.), specific software (e.g., BIOS, licenses, security programs, recovery programs, etc.), and so on.

Upon receipt of the electronic sales order 110, the specialized circuitry 100 electronically enters the details of the electronic sales order 110 into the expanded sales order 120 which the specialized circuitry 100 then uses as a workspace. In particular, the specialized circuitry 100 expands the electronic sales order 110 into individual BOM elements 150 (e.g., components 30) and BOW elements 160 (activities 32).

FIG. 4 shows a particular implementation in which the expanded sales order 120 takes the form of a spreadsheet 200. In the spreadsheet 200, the individual BOM elements 150 are input as BOM element line items (see items 1, 2, 3, 4, 5, 9, 10, 11, and 14), and individual BOW elements 160 which are input as BOW element line items (see items 6, 7, 8, 12, 13, and 15). It should be understood that, although the BOM and BOW element line items are illustrated as rows in the spreadsheet 200, the specialized circuitry 100 may store this information within other underlying data structures in the memory 56 (FIG. 2).

Each BOM element line item entered into the spreadsheet 200 identifies a particular BOM element 150, i.e., a component 30 of the product 26 (also see FIG. 1). In contrast, each BOW element line item identifies a particular BOW element 160, i.e., an activity 32 to be performed to manufacture the product 26 (also see FIG. 1). That is, each line of the spreadsheet 200 has a set of fields 210 including an item field 212 which holds an item number to identify the item on the spreadsheet 200, an element identifier (or ID) field 214 to hold an element identifier to uniquely identify the BOM or BOW element, a quantity field 216 to hold a quantity of the BOM or BOW element, a description field 218 to hold a description of the BOM or BOW element, a category field 220 to hold a category for the BOM or BOW element, and other fields 222.

In the context of a data storage system, example BOM elements 150 include circuit boards, storage device racks, storage devices, cables, chassis, power supplies, etc. In this data storage system context, example BOW elements 160 include installing storage devices, configuring or reworking circuit boards, fastening cables, mounting chassis within electronic cabinets, installing power supplies, performing tests, and so on.

After the specialized circuitry 100 expands the electronic sales order 110 into the individual BOM elements 150 and BOW elements 160 as illustrated in FIG. 4, the specialized circuitry 100 accesses the BOW definitions database 130 to obtain work attributes for the BOW elements 160 (arrow #2 in FIG. 3). These work attributes indicate work related requirements for the product 26 such as stages (e.g., locations or cells) within a manufacturing plant in which particular activities are to be performed, the amount of time expected to perform those activities, and so on. Some attributes can be locally defined for each manufacturing location, or globally set, meaning that the attributes are applicable to all manufacturing locations.

As shown in FIG. 5, the BOW definitions database 130 includes BOW element entries 240(1), 240(2), . . . (collectively, entries 240). Each BOW element entry 240 defines particular work attributes for a particular BOW element 160 (also see activities 32 in FIG. 1). In particular, each BOW element entry 240 has a set of fields 250 including an element identifier (or ID) field 252 to hold an element identifier to uniquely identify the BOW element, a description field 254 to hold a description of the activity of the BOW element, a category field 256 to hold a category for the BOW element, a BOW category field 258 to hold a particular classification of the BOW element, a standard time field 260 to hold a prescribed amount of time in which to perform the particular BOW element at the particular manufacturing stage when manufacturing the product, an assigned manufacturing stage field 262 to identify a particular manufacturing stage of the manufacturing facility that manufactures the product (the particular manufacturing stage being where a particular BOW activity is to be performed). Each entry 240 may include other fields as well.

In the context of a data storage system, the standard times in the standard time field 260 are in units of time (e.g., minutes, hours, days, etc.). Additionally, in this context, the manufacturing stages may be locations, cells, or equipment stations which are available within a data storage system manufacturing facility (e.g., burn in stations, crane equipped cells, assembly cells, rework stations, ESS chambers, cold rooms, heated rooms, shake tables, etc.).

Once the specialized circuitry 100 has retrieved the work attributes of the BOW elements 160 from the BOW element definitions database 130, the specialized circuitry 100 processes the line items of the spreadsheet 200 to produce a dynamic routing plan 80. In particular, the specialized circuitry 100 removes the BOM line items from the expanded sales order 120 (e.g., the spreadsheet 200 in FIG. 4). Additionally, the specialized circuitry 100 accesses the manufacturing stage database 140 to determine a sequence for the BOW elements 160 (arrow #3 in FIG. 3).

FIG. 6 shows an example manufacturing stage database 140 for a particular manufacturing facility. The manufacturing stages identified within the manufacturing stage database 140 correspond to work cells (or manufacturing stages) which make up an entire manufacturing facility. In particular, the database 140 accounts for all of the work cells available in a particular factory. As shown, the manufacturing stage database 140 includes manufacturing stage entries 280(1), 280(2), . . . (collectively, manufacturing stage entries 280) which can be used to define a processing order for the various manufacturing stages of the manufacturing facility. Each entry 280 includes a current stage field 292 to identify a current manufacturing stage, and a previous stage field 294 which identifies a previous manufacturing stage which comes immediately before the current manufacturing stage. The manufacturing stages which are identified by the specialized circuitry 100 (e.g., to determine an order for the BOW activities in a sales order) are taken from the manufacturing stage entries 280.

By way of example and in the context of a data storage system manufacturing facility, the entry 280(1) indicates that the CTO Runner stage is the first manufacturing stage in the facility since there is no previous manufacturing stage (i.e., the contents of the previous stage field 294 of the entry 280(1) is 0). Additionally, the entry 280(2) indicates that the next manufacturing stage after the CTO Runner stage is the CTO Desk stage (i.e., the contents of the previous stage field 294 of the entry 280(2) identifies the CTO Runner stage), and so on.

As the specialized circuitry 100 accesses the manufacturing stage database 140 and by referencing the BOW element definitions database 130 (FIG. 5), the specialized circuitry 100 is able to match each BOW element 160 of the spreadsheet 200 (FIG. 4) to a particular manufacturing stage (FIG. 6) and thus establish a sequence for the BOW elements 160. This sequence defines the order of the manufacturing stages that are required to manufacture the product 26.

It should be understood that it is not necessary for the product 26 to use every manufacturing stage in the manufacturing stage database 140, only the applicable ones associated with the BOW elements 160 on the order 120. Rather, if the product 26 does not require use of a particular manufacturing stage, the specialized circuitry 100 is able to still generate the sequence by skipping over unnecessary manufacturing stages.

With the above-described access to the manufacturing stage database 140, the specialized circuitry 100 produces a dynamic routing plan 80, i.e., an electronic report which details how the product 26 is to be built by the manufacturing facility (arrow #4 in FIG. 3). Such a plan 80 is then used by the manufacturer to effectively control manufacturing execution for proper allocation and scheduling of work resources at particular manufacturing stages, and to accurately identify when the product 26 will be completed and ready for shipping. Accordingly, the manufacturer is able to precisely understand the work requirements for building/assembling the product 26 and is able to coordinate these work requirements with the work requirements needed to manufacture other products 26.

In contrast to conventional approaches that use MES, the improved techniques disclosed herein inherently easily support a variety of custom-build products. That is, in contrast to a conventional MES which requires matching each specific order with the right pre-defined routing entered into the MES, the current techniques easily support a wide range of order variation as well as any change to the original sales order 110 no matter how big or small, or no matter how many options may be selected, by simply expanding the actual sales order 110 into BOW elements 160 and cross-referencing the databases 130, 140 to identify the required sequence of BOW activities and their attributes. Ultimately, the specialized circuitry 100 outputs the dynamic routing plan 80 which enables the manufacturer to understand precise details of the manufacturing process for that product 26, as well as dynamically understand the remaining work requirements while the product 26 is being manufactured. Further details will now be provided with reference to FIGS. 7 and 8.

FIGS. 7 and 8 show particular details of the dynamic routing plan 80 which is provided by the specialized circuitry 100 (also see FIG. 3). In particular, FIG. 7 is a first view 300 of a graphical user interface (GUI) 310 of the electronic apparatus 50 during a first operating time. FIG. 8 is a second view 320 of the GUI 310 of the electronic apparatus 50 during a second operating time.

With reference to FIG. 7, the GUI 310 is rendered by a display of the user interface 54 of the electronic apparatus 50 (also see FIG. 2) and enables the user to operate the specialized circuitry 100 (FIG. 3). Along these lines, the GUI 310 prompts a user to enter a particular sales order number into a field 330. When the user enters such a number into the field 330, and presses a button 332 which provides a command to generate a dynamic routing plan 80, the specialized circuitry 100 outputs work information from the dynamic routing plan 80 on the display. In particular, the specialized circuitry 100 renders BOW elements 160 as individual items in the proper manufacturing sequence along with their respective work attributes. That is, the GUI 310 displays the sequence of manufacturing activities required to manufacture the product 26 of the entered sales order in order from top to bottom and perhaps on further pages.

As shown in FIG. 7, the GUI 310 also shows the total amount of time required to manufacture the product 26. Accordingly, the user understands the time resources required to completely build the product 26.

As further shown in FIG. 7, currently needed BOW activities are displayed normally while subsequently needed BOW activities that follow the currently needed BOW activities are faded or un-highlighted (e.g., illustrated by the dashed boxes in FIG. 7). In the example, there is one BOW activity that is currently needed (i.e., item #1 in FIG. 7). Accordingly, the user easily sees the current manufacturing status of the product 26. Once the currently needed BOW activities are completed, the user indicates such completion (e.g., by manually clicking a complete box and hitting a save button to save changes). Alternatively, the specialized circuitry 100 may be automatically updated by notification circuitry at the particular manufacturing stages that perform the needed BOW activities.

Once the specialized circuitry 100 is notified that a particular BOW activity has been completed, the specialized circuitry 100 automatically updates the dynamic routing plan 80 to reflect this status. Along these lines and as shown in FIG. 8, the GUI 310 then displays more completed BOW activities normally. In particular, the GUI 310 in FIG. 8 now indicates that certain currently needed BOW activities of FIG. 7 have been completed (see the shaded complete box in FIG. 8). Additionally, some of the subsequently needed BOW activities of FIG. 7 (items #2, #3, and #4) are now normally displayed in FIG. 8 since they are now the new currently needed BOW activities that need to be completed. However, other subsequently needed BOW activities (items #5, #6, #7, and #8) that follow the new currently needed BOW activities are still faded or un-highlighted (e.g., illustrated by the dashed boxes in FIG. 8).

This process continues until the manufacturer has completed manufacturing of the product 26. Accordingly, the dynamic routing plan 26 continuously updates and interacts with the user during the entire manufacturing process. Further details will now be provided with reference to FIGS. 9 and 10.

Figure 9:
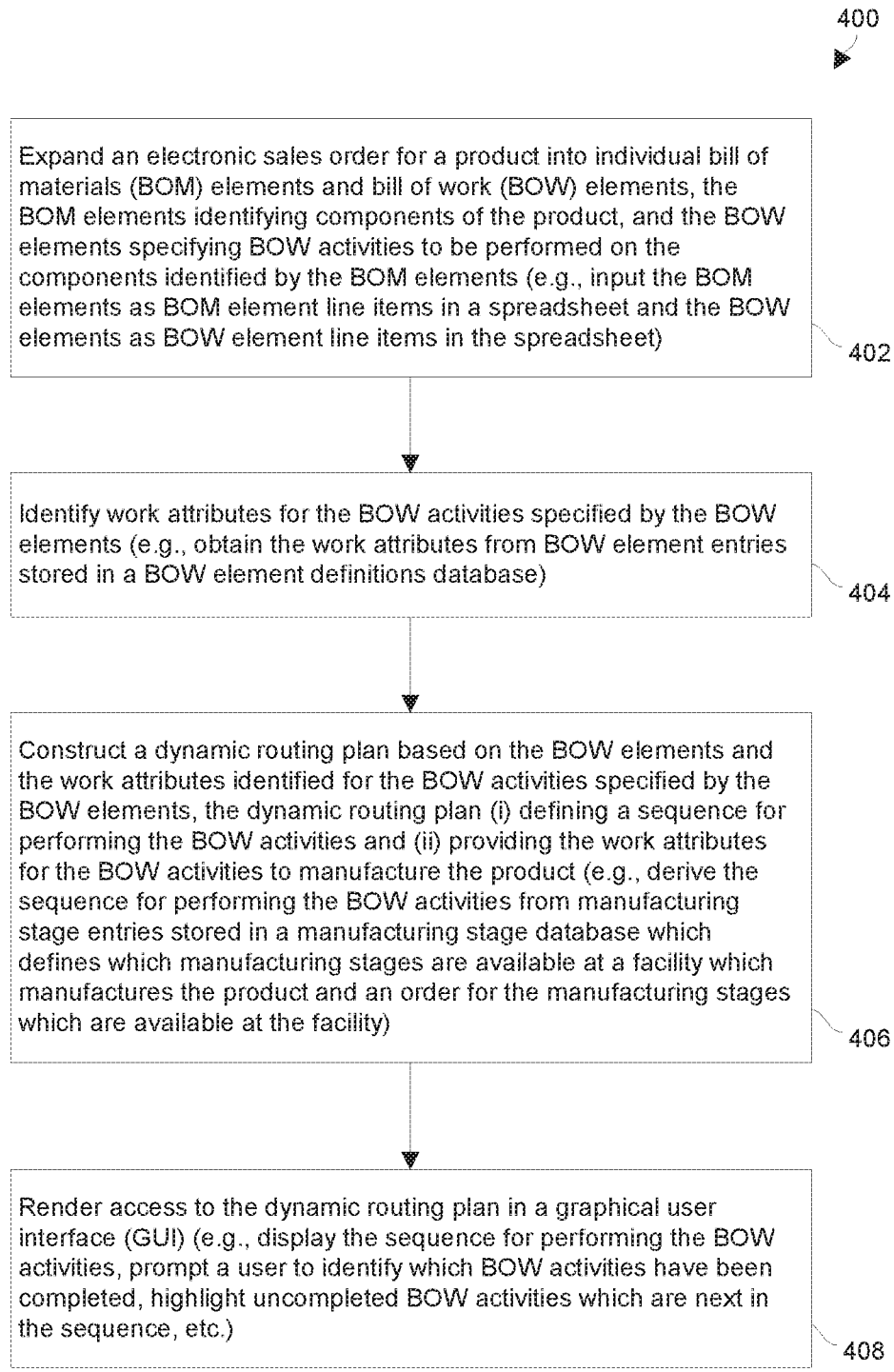
FIG. 9 is a high-level flowchart of a procedure which is performed by the electronic apparatus of FIG. 2.
Figure 10:
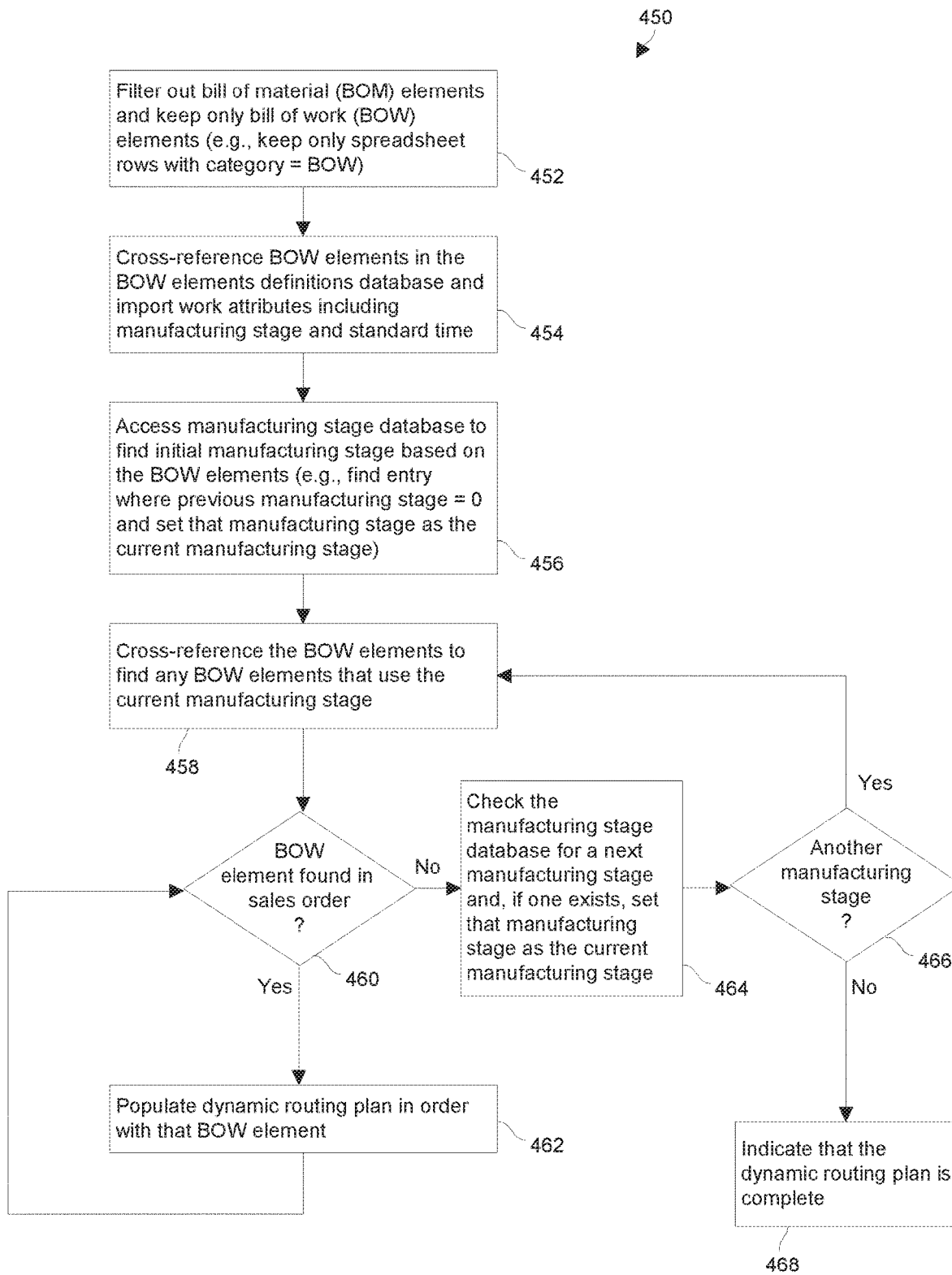
FIG. 10 is detailed flowchart of a procedure which is performed by the electronic apparatus of FIG. 2.

FIGS. 9 and 10 show flowcharts of procedures which are performed by the electronic apparatus 50 of FIG. 2 when providing a dynamic routing plan for manufacturing a product. FIG. 9 shows a high-level flowchart of a procedure 400 which is performed by the electronic apparatus 50. FIG. 10 shows a detailed flowchart of a procedure 450 which is suitable for certain steps in the procedure 400 of FIG. 9.

With reference to FIG. 9, the procedure 400 starts when the user directs the electronic apparatus 50 to generate a dynamic routing plan 80. For example, the user can operate the GUI 310 by entering a sales order number into field 330 and pressing the button 332 thus commanding the electronic apparatus 50 to provide a dynamic routing plan 80 for the product 26 identified by that sales order number (also see FIG. 7).

At 402, the electronic apparatus 50 expands an electronic sales order for the product into individual BOM elements and BOW elements. The BOM elements identify components of the product. The BOW elements specify BOW activities to be performed on the components identified by the BOM elements. In particular, the electronic apparatus 50 inputs the BOM elements of the electronic sales order as BOM element line items in a spreadsheet, and inputs the BOW elements of the electronic sales order as BOW element line items in the spreadsheet (also see FIG. 4).

At 404, the electronic apparatus 50 identifies work attributes for the BOW activities specified by the BOW elements. In particular, the electronic apparatus 50 obtains the work attributes from the BOW element entries stored in the BOW element definitions database (also see FIG. 5). For each BOW element (i.e., a representation of a particular BOW activity), the work attributes include (i) a particular manufacturing stage of the facility which manufactures the product, the particular manufacturing stage being where that BOW activity is to be performed and (ii) a prescribed amount of time in which to perform that BOW activity at the particular manufacturing stage when manufacturing the product. Along these lines, the electronic apparatus 50 removes the BOM element line items from the spreadsheet, and inputs manufacturing stage identifiers into the BOW element line items in the spreadsheet.

At 406, the electronic apparatus 50 constructs the dynamic routing plan based on the BOW elements and the work attributes identified for the BOW activities specified by the BOW elements. The dynamic routing plan (i) defines a sequence for performing the BOW activities and (ii) provides the work attributes for the BOW activities to manufacture the product (also see FIGS. 7 and 8). In particular, the electronic apparatus 50 derives the sequence for performing the BOW activities from the manufacturing stage entries stored in the manufacturing stage database (also see FIG. 6). Recall that each manufacturing stage entry stored in the manufacturing stage database defines (i) a current manufacturing stage and (ii) a preceding manufacturing stage which precedes the current manufacturing stage.

At 408, the electronic apparatus 50 renders access to the dynamic routing plan in a graphical user interface (GUI). In particular, the GUI displays the sequence for performing the BOW activities defined by the dynamic routing plan. As mentioned earlier with reference to FIGS. 7 and 8, the GUI (i) prompts a user to identify which BOW activities have been completed and (ii) highlights uncompleted BOW activities which are next in the sequence thus providing dynamic behavior.

FIG. 10 illustrates a procedure 450 which is suitable for certain steps in the procedure 400 of FIG. 9 for manufacturing the product 26. At the start of the procedure 450, the user has already commanded the electronic apparatus 50 to generate a dynamic routing plan 80 (e.g., by entering a sales order number in the field 330 and pressing the button 332 in the GUI 310 of FIG. 7). Furthermore, at the start of the procedure 450, the sales order 110 has already been expanded into BOM elements 150 and BOW elements 160. In particular, the BOM elements 150 are represented by BOM element line items in the spreadsheet 120, and the BOW elements 160 are represented by BOW element line items in the spreadsheet 120 (also see the spreadsheet 120 in FIG. 4).

At 452, the electronic apparatus 50 filters out BOM elements 150 and keeps only BOW elements 160 from the electronic sales order 110. In some arrangements, the electronic apparatus 50 simply deletes the line items from the spreadsheet 120 that do not have the BOW category listed in the category field of the line item thus leaving only the BOW line items in the spreadsheet 120 (also see FIG. 4).

Next, the electronic apparatus 50 cross-references the remaining BOW elements 160 in the spreadsheet 120 with the entries 240 in the BOW element definitions database 130 (FIG. 5). Here, the electronic apparatus 50 imports the work attributes such as manufacturing stage data and standard time data for each BOW element 160 into the spreadsheet 120. It should be understood that 452 and 454 are particular details for performing 404 in FIG. 9.

At 456, the electronic apparatus 50 accesses the manufacturing stage database 140 to find the initial manufacturing stage for the manufacturing facility (also see FIG. 6). Along these lines, the electronic apparatus 50 searches the manufacturing stage database 140 for the entry 280 which has, as the previous manufacturing stage, the value 0 to indicate that it is the first manufacturing stage at the manufacturing facility. In the example of FIG. 6, CTO Runner is the first manufacturing stage (see entry 280(1) in FIG. 6).

At 458, the electronic apparatus 50 cross-references the initial manufacturing stage at the manufacturing facility with the BOW elements 160 in the spreadsheet 120 to determine whether any of the BOW elements 160 use the initial manufacturing stage. At 460, if there is a BOW element 160 in the spreadsheet 120 that uses the initial manufacturing stage, 460 proceeds to 462. Otherwise, if there is not a BOW element 160 in the spreadsheet 120 that uses the initial manufacturing stage, 460 proceeds to 464.

At 462, the electronic apparatus 50 populates the dynamic routing plan 80 with the BOW element 160 that uses the initial manufacturing stage thus putting that BOW element 160 at the head of the sequence of BOW activities for manufacturing the product 26 (also see item #1 in FIG. 7). 462 then proceeds back to 460 to determine whether there are any other BOW elements 160 that use the initial manufacturing stage. If so, at 460 and 462, the electronic apparatus 50 adds those BOW elements 160 to the dynamic routing plan 80 so that those BOW elements 160 are at the beginning of the sequence as well.

At 464, when there are no BOW elements 160 for the initial manufacturing stage left to add to the dynamic routing plan 80, the electronic apparatus 50 checks the manufacturing stage database 140 for the next manufacturing stage at the manufacturing facility. In the example of FIG. 6, CTO Desk is the next manufacturing stage (see entry 280(2) in FIG. 6).

At 466, if there is another manufacturing stage at the manufacturing facility, 466 proceeds back to 458. Otherwise, if there is not another manufacturing stage at the manufacturing facility, 466 proceeds to 468.

In the example, since there is another manufacturing stage (i.e., CTO Desk), 466 proceeds to 458. Back at 458, the electronic apparatus 50 cross-references this manufacturing stage at the manufacturing facility with the BOW elements 160 in the spreadsheet 120 to find whether any of the BOW elements 160 use this manufacturing stage. Again, at 460, if there is a BOW element 160 in the spreadsheet 120 that uses this manufacturing stage, 460 proceeds to 462. Otherwise, if there is not a BOW element 160 in the spreadsheet 120 that uses this manufacturing stage, 460 proceeds to 464. In this manner, the electronic apparatus 50 builds the sequence for performing the BOW activities 32 in the dynamic routing plan (also see FIGS. 7 and 8).

After 464 and 466, if there are no further manufacturing stages at the manufacturing facility (i.e., if the procedure 450 has processed all of the BOW elements 160 and reached the end of the sequence), the electronic apparatus 50 proceeds to 468. At 468, the electronic apparatus 50 indicates that the dynamic routing plan 80 is complete. Based on the above, 456 through 468 provide particular details which are suitable for 406 in FIG. 9.

At this point, the electronic apparatus 50 outputs the dynamic routing plan 120 on the user interface 54 to the user (FIG. 7). Here, the user is presented with the GUI 310 which renders access to the dynamic routing plan 80 for manufacturing the product 26 (also see 408 in FIG. 9). Accordingly, going forward, the user is able to update the dynamic routing plan 80 during the manufacturing process for robust and reliable control over manufacturing execution (FIGS. 9 and 10).

As described above, improved techniques are directed to utilizing bill of work information to provide a dynamic routing plan 80 for manufacturing a product 26. This bill of work information identifies the "work to be done" (i.e., the steps or activities that are required to be completed) in order to manufacture the product 26. Along these lines, a sales order 110 for a particular product 26 is endowed with individual bill of materials elements 150 and bill of work elements 160. Next, a granular routing of the steps that are required when manufacturing the product 26 (i.e., a dynamic routing plan 80) is generated from the sales order 110. With such granular routing information now available, the manufacturer is able to effectively control various elements of the manufacturing process even if the sales order 110 is for a custom product 26 (i.e., a product which is built or assembled to order).

It should be understood that the techniques disclosed herein do not merely describe managing a bill of work using a computer. Rather, the improved techniques are directed to providing a dynamic routing plan for manufacturing a product inherently derived from the bill of work information. In particular, the improved techniques involve expanding an electronic sales order for the product into individual BOM elements and BOW elements where the BOW elements specify BOW activities to be performed on components identified by the BOM elements. The improved techniques do not require interfacing with a separate system to track and control both material and activities, i.e., all co-exist in one system. Additionally, the techniques involve electronically identifying work attributes for the BOW activities (e.g., stages of a manufacturing facility, expected amounts of required time, etc.). Furthermore, the techniques involve constructing, based on the BOW elements and work attributes, a dynamic routing plan which defines a sequence for performing the BOW activities as well as provides the work attributes for the BOW activities in order to manufacture a product. This dynamic routing plan is a particular structure with specialized operating aspects that improve manufacturing execution management as described herein.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic apparatus 50 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, one should appreciate that the above-described techniques can reduce complexity considerably in manufacturing systems by having a lighter data requirement (instruction=step). This complexity reduction unlocks many features that help manufacturing organizations at many levels. Exact detailed routings can now be created automatically for each sales order to include all the steps to manufacture a product, instead of having either high level generic routings, or numerous detailed manual routings. Also, displaying the instruction becomes the same as prompting for a step in a routing, which saves the trouble of setting two systems up. In addition, it becomes easy to know how long a sales order should take to be assembled (sum of all instruction times).

Furthermore, the implementation of an Automation Planning and Scheduling (APS) system becomes natural and easy instead of having to be intensely programmed by manually linking times to product variation. Also finance reporting by business unit becomes possible, in an easy way, since it is now known how long each sales order should take to be manufactured, this dynamic data can be automatically fed back to finance. Moreover, efficiency metrics such as labor per unit, can be automatically calculated without too much hard work, creating a climate for process improvement. Companies selling ERP and Manufacturing Execution Systems would benefit financially the most from this simple but powerful tool, by incorporating particular disclosed features in their software and reselling it as a solution. Companies manufacturing products with high variability and low volumes would also find this advantageous by implementing particular disclosed features thus saving a lot of hard work and enabling more capabilities.

It should be further understood that the various techniques described above can be integrated or combined with other manufacturing related applications and/or tools to augment their operation. Such other applications and/or tools include existing enterprise resource planning (ERP) systems, MRP systems, and the like. Such modifications and enhancements are intended to belong to various embodiments of the disclosure.

What is claimed is:

1. A computer-implemented method of providing a dynamic routing plan for manufacturing a product, the computer-implemented method comprising:
   receiving a sales order indicator into a field of a GUI (Graphical User Interface) rendered by an electronic apparatus, the sales order indicator identifying an electronic sales order for the product; and
   in response to the GUI receiving a user command to generate the dynamic routing,
      expanding, by processing circuitry operative in response to the GUI, the electronic sales order identified by the sales order indicator into an expanded sales order that includes individual bill of materials (BOM) elements and bill of work (BOW) elements, the BOM elements identifying components of the product, and the BOW elements specifying BOW activities to be performed on the components identified by the BOM elements;
      identifying, by the processing circuitry, work attributes for the BOW activities specified by the BOW elements;
      accessing, by the processing circuitry, a manufacturing stage database that defines a processing order of manufacturing stages available within a facility; and
      constructing, by the processing circuitry, the dynamic routing plan based on the BOW elements, the work attributes identified for the BOW activities specified by the BOW elements, and the processing order defined by the manufacturing stage database, the dynamic routing plan (i) defining a sequence, based on the processing order defined by the manufacturing stage database, for performing the BOW activities and (ii) providing the work attributes for the BOW activities to manufacture the product,
   wherein the method further comprises:
      rendering the sequence for performing the BOW activities defined by the dynamic routing plan in the GUI;
      prompting, by the GUI, a user to identify which BOW activities have been completed; and
      highlighting, by the GUI, uncompleted BOW activities which are next in the sequence,
   wherein the method further comprises:
      displaying, by the GUI, a first set of BOW activities to be completed in a first reporting cell in an activated fashion wherein text is displayed with first formatting;
      displaying, by the GUI, a second set of BOW activities to be completed in a second reporting cell in a deactivated fashion wherein text is displayed with second formatting different from the first formatting; and
      in response to the GUI receiving an indication that the first set of BOW activities has been completed in the first reporting cell, changing a display of the second set of BOW activities from the deactivated fashion to the activated fashion,
   wherein a BOW element definitions database stores BOW element entries which define (i) the BOW elements and (ii) the work attributes for the BOW activities specified by the BOW elements;
   wherein identifying the work attributes for the BOW activities includes obtaining the work attributes from the BOW element entries stored in the BOW element definitions database,
   wherein the manufacturing stage database stores manufacturing stage entries which define (i) manufacturing stages which are available at the facility which manufactures the product and (ii) an order for the manufacturing stages which are available at the facility, one entry in the manufacturing stage database identifying a first manufacturing stage within the facility and other entries in the manufacturing stage database manufacturing stage within the facility; and
   wherein constructing the dynamic routing plan includes deriving the sequence for performing the BOW activities from the manufacturing stage entries stored in the manufacturing stage database.

2. A computer-implemented method as in claim 1 wherein each BOW element entry stored in the BOW element definitions database defines, as work attributes, (i) a particular manufacturing stage of the facility which manufactures the product, the particular manufacturing stage being where a particular BOW activity is to be performed and (ii) a prescribed amount of time in which to perform the particular BOW activity at the particular manufacturing stage when manufacturing the product.

3. A computer-implemented method as in claim 2 wherein the manufacturing stage database is separate and distinct from the BOW element definitions database; and
   wherein each manufacturing stage entry stored in the manufacturing stage database defines (i) a current manufacturing stage and (ii) a preceding manufacturing stage which precedes the current manufacturing stage.

4. A computer-implemented method as in claim 1 wherein expanding the electronic sales order for the product into the expanded sales order that includes the individual BOM elements and BOW elements includes:
   inputting the BOM elements of the electronic sales order as BOM element line items in a spreadsheet, and
   inputting the BOW elements of the electronic sales order as BOW element line items in the spreadsheet.

5. A computer-implemented method as in claim 4 wherein identifying the work attributes for the BOW activities specified by the BOW elements includes:
   removing the BOM element line items from the spreadsheet, and
   inputting manufacturing stage identifiers into the BOW element line items in the spreadsheet.

6. A computer-implemented method as in claim 5 wherein each BOW element line item identifies a particular BOW activity; and wherein inputting the manufacturing stage identifiers into the BOW element line items in the spreadsheet includes, for each BOW element line item in the spreadsheet:
   reading a BOW element identifier from that BOW element line item,
   from a BOW element definitions database, finding a respective BOW element entry corresponding to that BOW element identifier, retrieving a respective manufacturing stage identifier from that respective BOW element entry, and storing that respective manufacturing stage identifier in that BOW element line item.

7. A computer-implemented method as in claim 6 wherein constructing the dynamic routing plan includes:

cross-referencing the BOW element line items in the spreadsheet with a manufacturing stage database to identify a starting BOW element line item which represents a starting BOW activity in the sequence defined by the dynamic routing plan.

8. A computer-implemented method as in claim 7 wherein constructing the dynamic routing plan further includes:

further cross-referencing the BOW element line items in the spreadsheet with the manufacturing stage database to identify subsequent BOW element line items which represent subsequent BOW activities to form the sequence defined by the dynamic routing plan.

9. A computer-implemented method as in claim 1 wherein the product is a data storage system; wherein the GUI displays multiple rows; and wherein rendering the sequence for performing the BOW activities includes:

outputting, in each row of the GUI, (i) a respective data storage system construction activity, (ii) a data storage system manufacturing stage where the respective data storage system construction activity is performed, and (iii) a prescribed amount of time in which to perform the respective data storage system construction activity while manufacturing the data storage system.

10. The computer-implemented method of claim 1, further comprising manufacturing the product in accordance with the dynamic routing plan generated by expanding the electronic sales order.

11. The computer-implemented method of claim 1, wherein deriving the sequence for performing the BOW activities from the manufacturing stage entries stored in the manufacturing stage database includes excluding, from the derived sequence, at least one manufacturing stage listed in the manufacturing stage database in response to said at least one manufacturing stage not applying to any BOW elements in the order.

12. An electronic apparatus to provide a dynamic routing plan for manufacturing a product, comprising:

a communications interface;

memory; and control circuitry coupled to the communications interface and the memory, the memory storing instructions which, when carried out by the control circuitry, cause the control circuitry to:

receive a sales order indicator into a field of a GUI (Graphical User Interface) rendered by the electronic apparatus, the sales order indicator identifying an electronic sales order for the product; and in response to receipt by the GUI of a user command to generate the dynamic routing, expand the electronic sales order identified by the sales order indicator, which is received through the communications interface, into individual bill of materials (BOM) elements and bill of work (BOW) elements, the BOM elements identifying components of the product, and the BOW elements specifying BOW activities to be performed on the components identified by the BOM elements, identify work attributes for the BOW activities specified by the BOW elements, access a manufacturing stage database that defines a processing order of manufacturing stages available within a facility; and construct the dynamic routing plan based on the BOW elements, the work attributes identified for the BOW activities specified by the BOW elements, and the processing order defined by the manufacturing stage database, the dynamic routing plan (i) defining a sequence, based on the processing order defined by the manufacturing stage database, for performing the BOW activities and (ii) providing the work attributes for the BOW activities to manufacture the product, wherein the control circuitry is further constructed and arranged to:

render the sequence for performing the BOW activities defined by the dynamic routing plan in the GUI;

prompt, by the GUI, a user to identify which BOW activities have been completed; and highlight uncompleted BOW activities which are next in the sequence, wherein the control circuitry is further constructed and arranged to:

display, by the GUI, a first set of BOW activities to be completed in a first reporting cell in an activated fashion wherein text is displayed with first formatting;

display, by the GUI, a second set of BOW activities to be completed in a second reporting cell in a deactivated fashion wherein text is displayed with second formatting different from the first formatting; and in response to the GUI receiving an indication that the first set of BOW activities has been completed in the first reporting cell, change a display of the second set of BOW activities from the deactivated fashion to the activated fashion, wherein the memory stores a BOW element definitions database having BOW element entries which define (i) the BOW elements and (ii) the work attributes for the BOW activities specified by the BOW elements; and wherein the control circuitry, when identifying the work attributes for the BOW activities, is constructed and arranged to obtain the work attributes from the BOW element entries of the BOW element definitions database, wherein the manufacturing stage database stores manufacturing stage entries which define manufacturing stages which are available at the facility which manufactures the product (ii) and an order for the manufacturing stages which are available at the facility, one entry in the manufacturing stage database identifying a first manufacturing stage within the facility and other entries in the manufacturing stage database indicating both a current manufacturing stage and a previous manufacturing stage within the facility; and wherein the control circuitry constructed and arranged to construct the dynamic routing plan is further constructed and arranged to derive the sequence for performing the BOW activities from the manufacturing stage entries stored in the manufacturing state database.

13. An electronic apparatus as in claim 12 wherein expanding the electronic sales order for the product into the expanded sales order that includes the individual BOM elements and BOW elements includes:

inputting the BOM elements of the electronic sales order as BOM element line items in a spreadsheet, and inputting the BOW elements of the electronic sales order as BOW element line items in the spreadsheet.

14. A computer program product having a non-transitory computer readable medium which stores a set of instructions to provide a dynamic routing plan for manufacturing a product, the set of instructions, when carried out by computerized circuitry, causing the computerized circuitry to perform a method of:

receiving a sales order indicator into a field of a GUI (Graphical User Interface) rendered by an electronic apparatus, the sales order indicator identifying an electronic sales order for the product; and in response to the GUI receiving a user command to generate the dynamic routing, expanding the electronic sales order identified by the sales order indicator into an expanded sales order that includes individual bill of materials (BOM) elements and bill of work (BOW) elements, the BOM elements identifying components of the product, and the BOW elements specifying BOW activities to be performed on the components identified by the BOM elements;

identifying work attributes for the BOW activities specified by the BOW elements;

accessing a manufacturing stage database that defines a processing order of manufacturing stages available within a facility; and constructing the dynamic routing plan based on the BOW elements and the work attributes identified for the BOW activities specified by the BOW elements, the dynamic routing plan (i) defining a sequence, based on the processing order defined by the manufacturing stage database, for performing the BOW activities and (ii) providing the work attributes for the BOW activities to manufacture the product, wherein the method further includes:

rendering the sequence for performing the BOW activities defined by the dynamic routing plan in the GUI;

prompting, by the GUI, a user to identify which BOW activities have been completed; and highlighting, by the GUI, uncompleted BOW activities which are next in the sequence, wherein the method further comprises:

displaying, by the GUI, a first set of BOW activities to be completed in a first reporting cell in an activated fashion wherein text is displayed with first formatting;

displaying, by the GUI, a second set of BOW activities to be completed in a second reporting cell in a deactivated fashion wherein text is displayed with second formatting different from the first formatting; and in response to the GUI receiving an indication that the first set of BOW activities has been completed in the first reporting cell, changing a display of the second set of BOW activities from the deactivated fashion to the activated fashion, wherein a BOW element definitions database stores BOW element entries which define (i) the BOW elements and (ii) the work attributes for the BOW activities specified bar the BOW elements;

wherein identifying the work attributes for the BOW activities includes obtaining the work attributes from the BOW element entries stored in the BOW element definitions database;

wherein the manufacturing stage database stores manufacturing stage entries which define (i) manufacturing stages which are available at the facility which manufactures the product and (ii) an order for the manufacturing stages which are available at the facility, one entry in the manufacturing stage database identifying a first manufacturing stage within the facility and other entries in the manufacturing stage database indicating both a current manufacturing stage and a previous manufacturing stage within the facility; and wherein constructing the dynamic routing plan includes deriving the sequence for performing the BOW activities from the manufacturing stage entries stored in the manufacturing stage database.

15. A computer program product as in claim 14 wherein expanding the electronic sales order for the product into the expanded sales order that includes the individual BOM elements and BOW elements includes:

inputting the BOM elements of the electronic sales order as BOM element line items in a spreadsheet, and inputting the BOW elements of the electronic sales order as BOW element line items in the spreadsheet; and wherein obtaining the work attributes from the BOW element entries stored in the BOW element definitions database includes:

removing the BOM element line items from the spreadsheet, and inputting manufacturing stage identifiers from the BOW element entries into the BOW element line items in the spreadsheet.

16. A computer program product as in claim 15 wherein the product is a data storage system; wherein the GUI displays multiple rows; and wherein rendering the sequence for performing the BOW activities includes:

outputting, in each row of the GUI, (i) a respective data storage system construction activity, (ii) a data storage system manufacturing stage where the respective data storage system construction activity is performed, and (iii) a prescribed amount of time in which to perform the respective data storage system construction activity while manufacturing the data storage system.

* * * * *